United States Patent
Hitomi et al.

(10) Patent No.: US 9,985,673 B2
(45) Date of Patent: May 29, 2018

(54) TRANSMISSION-RECEPTION APPARATUS AND REFLECTED SIGNAL SUPPRESSING METHOD

(71) Applicant: Murata Manufacturing Co., Ltd., Kyoto (JP)

(72) Inventors: Shinya Hitomi, Kyoto (JP); Hidenori Obiya, Kyoto (JP); Shinya Mizoguchi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 59 days.

(21) Appl. No.: 15/278,362

(22) Filed: Sep. 28, 2016

(65) Prior Publication Data

US 2017/0019138 A1    Jan. 19, 2017

Related U.S. Application Data

(63) Continuation of application No. PCT/JP2015/057247, filed on Mar. 12, 2015.

(30) Foreign Application Priority Data

Mar. 31, 2014   (JP) .................................. 2014-070756

(51) Int. Cl.
*H04B 1/18*    (2006.01)
*H04B 1/04*    (2006.01)
(Continued)

(52) U.S. Cl.
CPC .............. *H04B 1/18* (2013.01); *H04B 1/0458* (2013.01); *H04B 1/40* (2013.01); *H04L 5/1461* (2013.01)

(58) Field of Classification Search
CPC .......... H04B 1/0458; H04B 1/18; H04B 1/40; H04B 1/48; H04B 1/525; H04B 17/345;
(Continued)

(56) References Cited

U.S. PATENT DOCUMENTS 5,574,978 A    11/1996  Talwar et al.
8,798,179 B2 *  8/2014  Koizumi .............. H04B 1/0475
                                                           370/338
(Continued)

FOREIGN PATENT DOCUMENTS

JP    2004-194097 A    7/2004
JP    2009-194639 A    8/2009
JP    2010-062997 A    3/2010

OTHER PUBLICATIONS

International Search Report for PCT/JP2015/057247 dated Jun. 2, 2015.
Written Opinion for PCT/JP2015/057247 dated Jun. 2, 2015.

*Primary Examiner* — Ahmed Elallam
(74) *Attorney, Agent, or Firm* — Pearne & Gordon LLP (57) ABSTRACT

An amplitude phase parameter calculator in a control unit or circuit in a transmission-reception apparatus calculates an amplitude difference voltage and a phase difference voltage between a transmission detection signal and a reflected detection signal. Adjustment factors including a combination of an amplitude control voltage and a phase control voltage corresponding to a combination of the amplitude difference voltage and the phase difference voltage are discretely stored in an adjustment factor determination table in the control unit. An adjustment factor determiner in the control unit determines the adjustment factors using the combination of the amplitude difference voltage and the phase difference voltage and the adjustment factor determination table. If the adjustment factors do not exist in the adjustment factor determination table, the adjustment factor determiner calculates target adjustment factors using the relationship among the adjustment factors stored in the table, the amplitude difference voltage, and the phase difference voltage.

8 Claims, 6 Drawing Sheets

(51) Int. Cl.
*H04B 1/40* (2015.01)
*H04L 5/14* (2006.01)

(58) Field of Classification Search
CPC ............ H04B 1/0475; H04B 2001/485; H04L 5/1461; H04L 5/14; G01S 13/02; G01S 7/038; G01S 7/034; H01Q 3/2611; H03H 7/463
See application file for complete search history.

(56) References Cited

U.S. PATENT DOCUMENTS

| | | | | |
|---|---|---|---|---|
| 8,860,525 | B2 * | 10/2014 | Manssen | H03H 7/40 |
| | | | | 333/17.3 |
| 9,407,315 | B2 * | 8/2016 | Obiya | H04B 1/48 |
| 9,739,871 | B2 * | 8/2017 | Obiya | H04B 1/525 |
| 9,780,437 | B2 * | 10/2017 | Knox | H01Q 1/24 |
| 2002/0072344 | A1 * | 6/2002 | Souissi | H04B 1/123 |
| | | | | 455/296 |
| 2004/0014449 | A1 * | 1/2004 | Adachi | H04B 1/525 |
| | | | | 455/296 |
| 2010/0039965 | A1 | 2/2010 | Yamazaki | |
| 2011/0134810 | A1 * | 6/2011 | Yamamoto | H04L 5/143 |
| | | | | 370/278 |
| 2014/0300432 | A1 * | 10/2014 | Uejima | H04B 1/525 |
| | | | | 333/132 |
| 2016/0269072 | A1 * | 9/2016 | Obiya | H04B 1/525 |

\* cited by examiner

TRANSMISSION-RECEPTION APPARATUS AND REFLECTED SIGNAL SUPPRESSING METHOD

This application is a continuation of International Application No. PCT/JP2015/057247 filed on Mar. 12, 2015 which claims priority from Japanese Patent Application No. 2014-070756 filed on Mar. 31, 2014. The contents of these applications are incorporated herein by reference in their entireties.

BACKGROUND

Technical Field

The present disclosure relates to a transmission-reception apparatus that performs transmission and reception in multiple communication bands using a common antenna for the multiple communication bands.

Various transmission-reception apparatuses have hitherto been devised, which have a configuration suppressing entrance of a transmission signal that is reflected from an antenna into a reception circuit. For example, in Patent Document 1, part of a transmission signal is divided to generate a divided signal and a reflected signal that enters a reception circuit and that is based on the transmission signal is cancelled with the divided signal.

Accordingly, in Patent Document 1, a noise canceller circuit that adjusts the amplitude and the phase of the divided signal is provided. The noise canceller circuit includes an attenuator and adjusts the amplitude of the divided signal so that the amplitude of the reflected signal entering the reception circuit substantially coincides with the amplitude of the divided signal. In addition, the noise canceller circuit adjusts the phase of the divided signal so that the divided signal is in opposite phase with the reflected signal.

Patent Document 1: Japanese Unexamined Patent Application Publication No. 2004-194097

BRIEF SUMMARY

However, when the noise canceller circuit described above is used, it is not possible to appropriately suppress the reflected signal with the divided signal if the amplitude and the phase of the reflected signal are not known. In particular, in an environment in which antenna impedance is varied, it is further difficult to appropriately suppress the reflected signal with the divided signal.

The present disclosure provides a transmission-reception apparatus capable of appropriately suppressing a reflected signal from an antenna with a divided signal of a transmission signal.

Solution to Problem

The present disclosure provides a transmission-reception apparatus including a first RF circuit, a second RF circuit, an antenna duplexer, a demultiplexer, a signal adjusting unit or circuit, and a multiplexer. The first RF circuit at least includes a transmission circuit that outputs a transmission signal. The second RF circuit includes a reception circuit that receives a reception signal. The antenna duplexer is connected between the first RF circuit and second RF circuit and an antenna, transmits the transmission signal from the first RF circuit to the antenna, and transmits the reception signal from the antenna to the second RF circuit. The demultiplexer demultiplexes the transmission signal. The signal adjusting unit or circuit adjusts at least one of an amplitude and a phase of a demultiplexed signal demultiplexed by the demultiplexer. The multiplexer is connected between the antenna duplexer and the second RF circuit and multiplexes the demultiplexed signal adjusted in the signal adjusting unit or circuit with a signal to be transmitted from the antenna duplexer to the second RF circuit.

The transmission-reception apparatus further includes a sensing unit or circuit and a control unit or circuit. The sensing unit or circuit detects the transmission signal and a reflected signal of the transmission signal from the antenna. The control unit or circuit determines an adjustment factor based on a result of the detection in the sensing unit or circuit to adjust a circuit factor of the signal adjusting circuit. The sensing unit or circuit detects the transmission signal and the reflected signal to detect an amplitude and a phase of a transmission detection signal and an amplitude and a phase of a reflected detection signal. The control unit or circuit includes an adjustment factor determination table that discretely stores in advance adjustment factors including an amplitude control value and a phase control value corresponding to a combination of an amplitude difference value and a phase difference value between the transmission detection signal and the reflected detection signal. The control unit or circuit calculates the amplitude difference value and the phase difference value from the amplitude and the phase of the transmission detection signal and the amplitude and the phase of the reflected detection signal. The control unit or circuit determines the adjustment factors realizing the amplitude and the phase of the demultiplexed signal using the combination of the amplitude difference value and the phase difference value and the adjustment factor determination table and supplies the determined adjustment factors to the signal adjusting unit or circuit.

With the above configuration, the reflected signal of the transmission signal output from the first RF circuit is exactly cancelled with the demultiplexed signal that is demultiplexed by the demultiplexer and that is subjected to the amplitude and phase adjustment in the signal adjusting unit or circuit even if the reflected signal enters the second RF circuit side.

If the combination of the amplitude difference value and the phase difference value is not stored in the adjustment factor determination table, the control unit or circuit in the transmission-reception apparatus of the present disclosure can determine the adjustment factors using multiple combinations of the amplitude difference value and the phase difference value, stored in the adjustment factor determination table, and the combination of the amplitude difference value and the phase difference value that are calculated.

With the above configuration, it is possible exactly cancel the reflected signal even if the combination of the amplitude control value and the phase control value corresponding to the combination of the amplitude difference value and the phase difference value is not stored. In addition, the use of the table in which the adjustment factors are discretely stored allows the capacity of stored data to be suppressed.

The transmission-reception apparatus of the present disclosure may have the following configuration. The sensing unit or circuit includes a balun circuit, a hybrid circuit, and first and second amplitude-phase detection circuits. The balun circuit outputs a first signal and a second signal that is in opposite phase with the first signal from the reflected detection signal. The hybrid circuit outputs a third signal and a fourth signal that is in phase with the third signal from the transmission detection signal. The first amplitude-phase detection circuit detects the amplitudes and the phases of the transmission detection signal and the reflected detection signal from the first signal and the third signal. The second amplitude-phase detection circuit detects the amplitudes and the phases of the transmission detection signal and the reflected detection signal from the second signal and the fourth signal.

The transmission-reception apparatus of the present disclosure may have the following configuration. The sensing unit or circuit includes a balun circuit, a hybrid circuit, and first and second amplitude-phase detection circuits. The balun circuit outputs a first signal and a second signal that is in opposite phase with the first signal from the transmission detection signal. The hybrid circuit outputs a third signal and a fourth signal that is in phase with the third signal from the reflected detection signal. The first amplitude-phase detection circuit detects the amplitudes and the phases of the transmission detection signal and the reflected detection signal from the first signal and the third signal. The second amplitude-phase detection circuit detects the amplitudes and the phases of the transmission detection signal and the reflected detection signal from the second signal and the fourth signal.

With the above configurations, the phase difference between the transmission detection signal and the reflected detection signal is capable of being detected within a range from 0° to 360° even when the phase range of each amplitude-phase detection circuit is 180°.

It is possible to appropriately suppress the reflected signal from the antenna with the distribution signal of the transmission signal.

DETAILED DESCRIPTION

Figure 1:
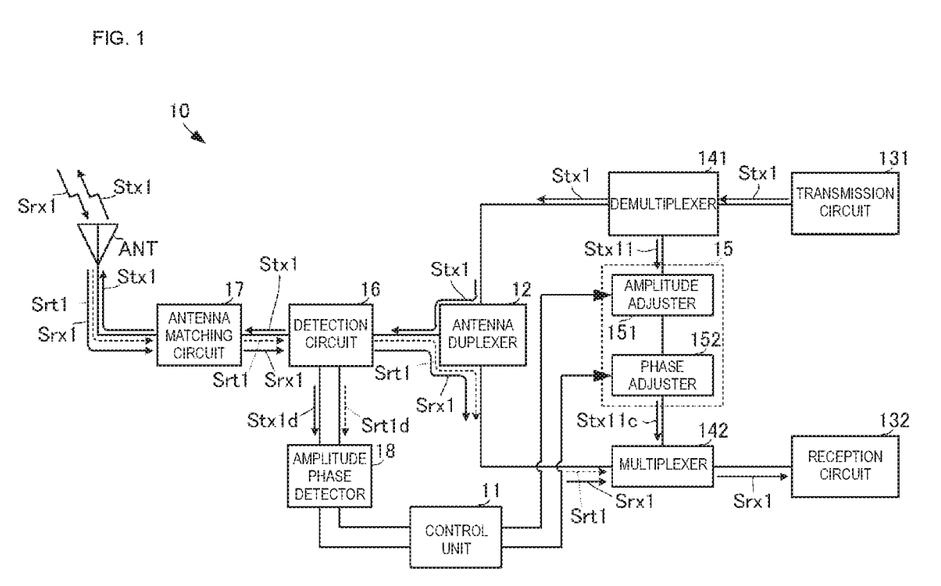
FIG. 1 is a circuit block diagram of a transmission-reception apparatus according to a first embodiment of the present disclosure.

A transmission-reception apparatus 10 according to a first embodiment of the present disclosure will herein be described with reference to the attached drawings. FIG. 1 is a circuit block diagram of the transmission-reception apparatus 10 according to the first embodiment of the present disclosure. Although an aspect in which a transmission signal is reflected from an antenna and enters a reception circuit side is illustrated below, the following configuration is also applicable to an aspect in which a harmonic signal of a transmission signal in a first communication band is reflected from an antenna and enters a circuit that receives a reception signal in a second communication band.

The transmission-reception apparatus 10 includes a control unit or circuit 11, an antenna duplexer 12, a transmission circuit 131, a reception circuit 132, a demultiplexer 141, a multiplexer 142, a signal adjusting unit or circuit 15, a detection circuit 16, an antenna matching circuit 17, an amplitude phase detector 18, and an antenna ANT. The transmission circuit 131 corresponds to a first radio-frequency (RF) circuit of the present disclosure, the reception circuit 132 corresponds to a second RF circuit of the present disclosure, and a circuit composed of the detection circuit 16 and the amplitude phase detector 18 corresponds to a sensing unit or circuit of the present disclosure.

The transmission circuit 131, the reception circuit 132, and the antenna ANT are connected to the antenna duplexer 12. The transmission circuit 131 transmits a transmission signal Stx1 in a predetermined communication band. The reception circuit 132 receives a reception signal Srx1 in a predetermined communication band.

The antenna duplexer 12 transmits at least the transmission signal Stx1 between the transmission circuit 131 and the antenna ANT with low loss. The antenna duplexer 12 transmits at least the reception signal Srx1 between the antenna ANT and the reception circuit 132 with low loss.

The demultiplexer 141 is connected between the transmission circuit 131 and the antenna duplexer 12. The multiplexer 142 is connected between the reception circuit 132 and the antenna duplexer 12. The signal adjusting unit or circuit 15 is connected between the demultiplexer 141 and the multiplexer 142. The signal adjusting unit or circuit 15 includes an amplitude adjuster 151 and a phase adjuster 152. The amplitude adjuster 151 and the phase adjuster 152 are connected in series between the demultiplexer 141 and the multiplexer 142. The amplitude adjuster 151 and the phase adjuster 152 may be connected between the demultiplexer 141 and the multiplexer 142 in a reverse order.

The detection circuit 16 and the antenna matching circuit 17 are connected in series between the antenna duplexer 12 and the antenna ANT.

The detection circuit 16 detects the transmission signal Stx1 and a reflected signal Srt1 resulting from reflection of the transmission signal Stx1 from the antenna ANT. The detection circuit 16 is composed of, for example, a bidirectional coupler and individually outputs the transmission signal Stx1 and the reflected signal Srt1 which are transmitted between the antenna ANT and the antenna duplexer 12 and which are isolated from each other.

The amplitude phase detector 18 detects the amplitudes of the transmission signal Stx1 and the reflected signal Srt1 output from the detection circuit 16 as voltage values. The amplitude phase detector 18 detects the phases of the transmission signal Stx1 and the reflected signal Srt1 output from the detection circuit 16 as voltage values.

The antenna matching circuit 17 performs impedance matching between the antenna ANT and the antenna duplexer 12. The antenna matching circuit 17 can be a variable impedance matching circuit.

The amplitude phase detector 18 is connected to the control unit or circuit 11. The control unit or circuit 11 is connected to the signal adjusting unit or circuit 15.

The control unit or circuit 11 determines adjustment factors to be applied to the signal adjusting unit or circuit 15 based on the results of the detection by the amplitude phase detector 18 so that the reflected signal Srt1 is cancelled by a demultiplexed signal Stx11 demultiplexed by the demultiplexer 141. A specific control process by the control unit or circuit 11 will be described below. The signal adjusting unit or circuit 15 determines circuit element values of the amplitude adjuster 151 and the phase adjuster 152 based on the adjustment factors.

The transmission-reception apparatus 10 having the above circuit configuration operates in the following manner when the transmission signal Stx1 is reflected and enters the reception circuit 132 due to a change in antenna impedance caused by an external environment.

The transmission circuit 131 generates the transmission signal Stx1 and supplies the transmission signal Stx1 to the antenna duplexer 12 side. The demultiplexer 141 demultiplexes the transmission signal Stx1. The demultiplexed signal Stx11 is supplied to the signal adjusting unit or circuit 15.

The antenna duplexer 12 transmits the transmission signal Stx1 to the antenna ANT side. The transmission signal Stx1 that has passed through the antenna duplexer 12 is supplied to the antenna ANT through the detection circuit 16 and the antenna matching circuit 17. Since the impedance matching is performed by the antenna matching circuit 17 here, the transmission signal Stx1 is externally transmitted from the antenna ANT with little reflection from the antenna ANT if any load change caused by an external factor does not occur in the antenna ANT.

However, if any load change occurs in the antenna ANT, part of the transmission signal Stx1 is reflected from the antenna ANT and is transmitted to the antenna duplexer 12 side. In other words, the reflected signal Srt1 of the transmission signal Stx1 is transmitted to the antenna duplexer 12 side.

The detection circuit 16 isolates the transmission signal Stx1 from the reflected signal Srt1 and supplies the transmission signal Stx1 and the reflected signal Srt1 that are isolated from each other to the amplitude phase detector 18.

The amplitude phase detector 18 detects the amplitudes and the phases of a transmission detection signal Stx1d and a reflected detection signal Srt1d that are isolated from each other as voltage values. The amplitude phase detector 18 calculates a difference voltage (amplitude difference voltage) between the amplitude voltage of the transmission detection signal Stx1d and the amplitude voltage of the reflected detection signal Srt1d. The amplitude phase parameter calculator 111 calculates a difference voltage (phase difference voltage) between the phase voltage of the transmission detection signal Stx1d and the phase voltage of the reflected detection signal Srt1d. The amplitude phase detector 18 supplies the amplitude difference voltage and the phase difference voltage to the control unit or circuit 11.

Figure 2:
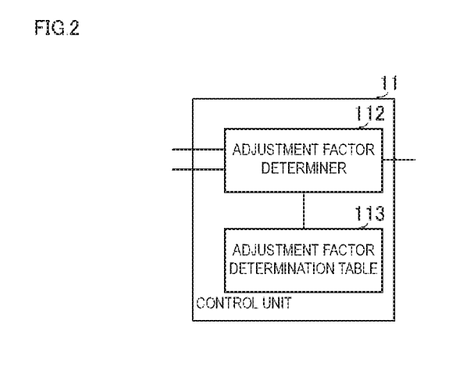
FIG. 2 is a circuit block diagram of a control unit or circuit in the transmission-reception apparatus according to the first embodiment of the present disclosure.

FIG. 2 is a block diagram illustrating a configuration of the control unit or circuit in the transmission-reception apparatus according to the first embodiment of the present disclosure. The control unit or circuit 11 includes an adjustment factor determiner 112 and an adjustment factor determination table 113.

The adjustment factor determiner 112 determines amplitude control voltage (amplitude adjustment factor) and phase control voltage (phase adjustment factor) using the amplitude difference voltage, the phase difference voltage, and the adjustment factor determination table 113 and supplies the amplitude control voltage (amplitude adjustment factor) and the phase control voltage (phase adjustment factor) to the signal adjusting unit or circuit 15. Here, the adjustment factor determiner 112 supplies the amplitude control voltage to the amplitude adjuster 151 and supplies the phase control voltage to the phase adjuster 152.

Figure 3:
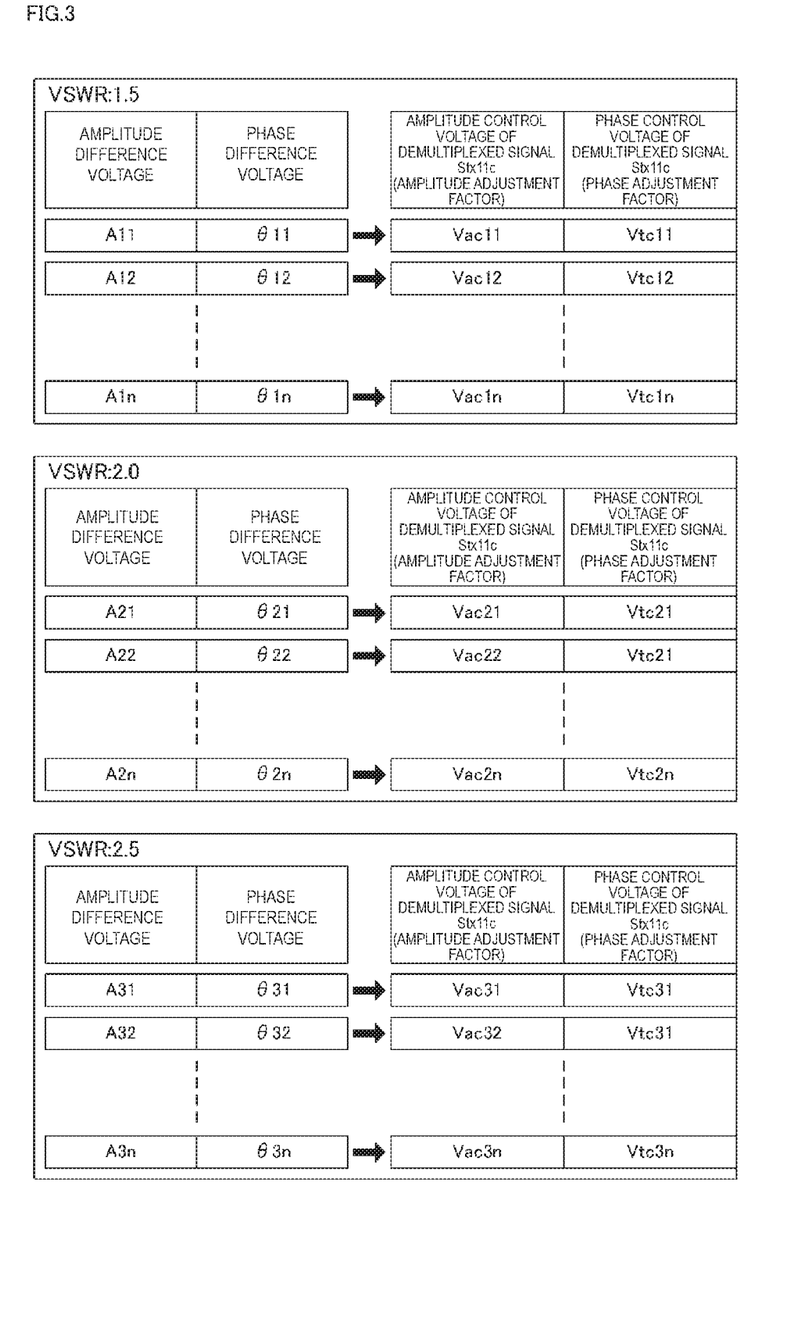
FIG. 3 illustrates one aspect of an adjustment factor determination table in the transmission-reception apparatus according to the first embodiment of the present disclosure.

More specifically, the adjustment factor determiner 112 determines the amplitude control voltage and the phase control voltage in the following manner. FIG. 3 illustrates one aspect of the adjustment factor determination table in the transmission-reception apparatus according to the first embodiment of the present disclosure.

As illustrated in FIG. 3, amplitude control voltage Vac and phase control voltage Vtc corresponding to each combination of amplitude difference voltage A and phase difference voltage θ are stored in the adjustment factor determination table 113. The amplitude control voltage Vac determines an amplitude factor used to make the amplitude of the demultiplexed signal Stx11 substantially equal to the amplitude of the reflected signal Srt1 in the multiplexer 142. The phase control voltage Vtc determines a phase factor used to make the demultiplexed signal Stx11 in opposite phase (a phase difference of 180°) with the reflected signal Srt1 in the multiplexer 142.

The amplitude control voltage Vac and the phase control voltage Vtc corresponding to each combination of the amplitude difference voltage A and the phase difference voltage θ are discretely stored in the adjustment factor determination table 113. For example, as illustrated in FIG. 4, the amplitude control voltages Vac and the phase control voltages Vtc corresponding to combinations of the amplitude difference voltage A and the phase difference voltage θ in specific Voltage Standing Wave Ratio (VSWR) (VSWR=1.5, 2.0, and 2.5 in the present embodiment) states are stored in the adjustment factor determination table 113.

If the combination of the amplitude difference voltage A and the phase difference voltage θ that are acquired exists in the adjustment factor determination table 113, the adjustment factor determiner 112 reads out the amplitude control voltage Vac and the phase control voltage Vtc corresponding to the combination of the amplitude difference voltage A and the phase difference voltage θ that are acquired. For example, when the combination of amplitude difference voltage A11 and phase difference voltage θ11 is acquired, the adjustment factor determiner 112 reads out amplitude control voltage Vac11 and phase control voltage Vtc11.

In contrast, if the combination of the amplitude difference voltage A and the phase difference voltage θ that are acquired does not exist in the adjustment factor determination table 113, the adjustment factor determiner 112 calculates the amplitude control voltage Vac and the phase control voltage Vtc through arithmetic processing based on the following concept. FIG. 4 includes graphs for describing a concept to determine the adjustment factors in the transmission-reception apparatus according to the first embodiment of the present disclosure. An upper graph in FIG. 4 indicates the relationship between the amplitude difference voltage and the phase difference voltage and a lower graph in FIG. 4 indicates the relationship between the amplitude control voltage and the phase control voltage.

Figure 4:
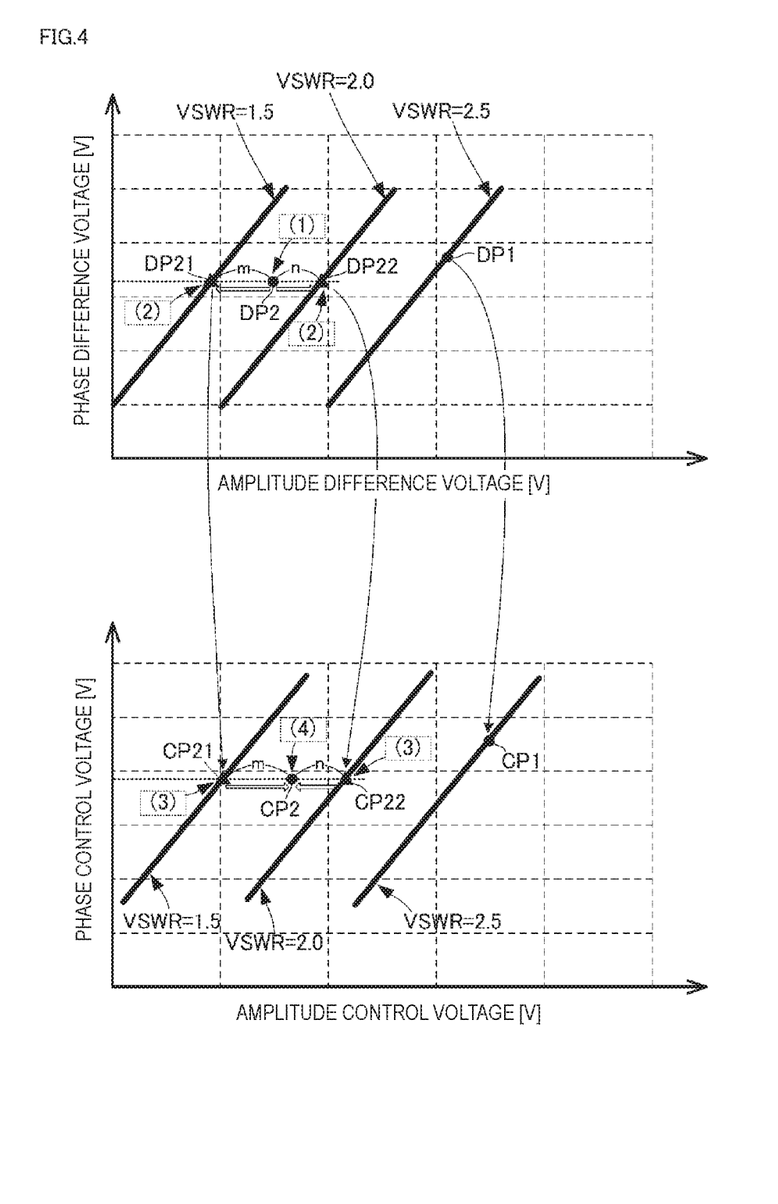
FIG. 4 includes graphs for describing a concept to determine adjustment factors in the transmission-reception apparatus according to the first embodiment of the present disclosure.

As indicated in the upper graph in FIG. 4, linear relationship is established between the amplitude difference voltage and the phase difference voltage even if the VSWR is varied. In addition, the amount of change of the phase difference voltage (the slope illustrated in the upper graph in FIG. 4) is the same as the amount of change of the amplitude difference voltage for different VSWRs.

As indicated in the lower graph in FIG. 4, linear relationship is established between the amplitude control voltage and the phase control voltage even if the VSWR is varied. In addition, the amount of change of the phase control voltage (the slope illustrated in the upper graph in FIG. 4) is the same as the amount of change of the amplitude control voltage for different VSWRs. Each point on characteristic straight lines illustrated in the lower graph in FIG. 4 corresponds to the amplitude control voltage Vac and the phase control voltage Vtc in the table in FIG. 3.

(1) If the combination of the amplitude difference voltage and the phase difference voltage that are calculated is not stored in the adjustment factor determination table 113 (a point DP2 in FIG. 4), the adjustment factor determiner 112 searches for the amplitude difference voltage stored in the adjustment factor determination table 113 along a direction in which the amplitude difference voltage is shifted while fixing the phase difference voltage. Here, the adjustment factor determiner 112 searches for multiple (two in the present embodiment) amplitude difference voltages that are stored.

(2) The adjustment factor determiner 112 detects two amplitude difference voltages (first calculation amplitude difference voltage and second calculation amplitude difference voltage) (a point DP21 and a point DP22 in FIG. 4). The two amplitude difference voltages include amplitude difference voltage having a value closest to that of the calculated amplitude difference voltage and amplitude difference voltage having a value next closest to that of the calculated amplitude difference voltage, which are stored in the adjustment factor determination table 113 and which has the same phase difference voltage.

(3) The adjustment factor determiner 112 reads out from the adjustment factor determination table 113 a combination of first calculation amplitude control voltage and the phase control voltage, which corresponds to the combination (the point DP21 in FIG. 4) of the first calculation amplitude difference voltage and the phase difference voltage (a point CP21 in FIG. 4).

The adjustment factor determiner 112 reads out from the adjustment factor determination table 113 a combination of second calculation amplitude control voltage and the phase control voltage, which corresponds to the combination (the point DP22 in FIG. 4) of the second calculation amplitude difference voltage and the phase difference voltage (a point CP22 in FIG. 4).

(4) The adjustment factor determiner 112 calculates the amplitude control voltage Vac using the first calculation amplitude control voltage and the second calculation amplitude control voltage (a point CP2 in FIG. 4).

Specifically, the adjustment factor determiner 122 calculates a ratio (corresponding to m:n in FIG. 4) between the absolute value of the difference between the amplitude difference voltage and the first calculation amplitude difference voltage (corresponding to the distance between the point DP2 and the point DP21 in FIG. 4) and the absolute value of the difference between the amplitude difference voltage and the second calculation amplitude difference voltage (corresponding to the distance between the point CP2 and the point CP22 in FIG. 4).

The adjustment factor determiner 112 calculates target amplitude control voltage through, for example, the arithmetic processing of an internal ratio described below using the above ratio, the first calculation amplitude control voltage corresponding to the first calculation amplitude difference voltage, and the second calculation amplitude control voltage corresponding to the second calculation amplitude difference voltage.

For example, target amplitude control voltage VacP is calculated according to the following equation:

$$VacP = (nVac1k + mVac2k)/(m+n)$$

wherein Vac1k denotes the first calculation amplitude control voltage and Vac2k denotes the second calculation amplitude control voltage.

In addition, the adjustment factor determiner 112 calculates target phase control voltage through, for example, the arithmetic processing of an internal ratio described below using the above ratio and first calculation phase control voltage corresponding to first calculation phase difference voltage or second calculation phase control voltage corresponding to second calculation phase difference voltage.

For example, target phase control voltage VtcP is determined according to the following equation:

$$VtcP = (nVtc1k + mVtc2k)/(m+n)$$

wherein Vtc1k denotes the first calculation phase control voltage and Vtc2k denotes the second calculation amplitude control voltage.

Since Vtc1k=Vtc2k basically, the adjustment factor determiner 112 may calculate the phase control voltage VtcP using VtcP=Vtc1k or VtcP=Vtc2k. The amplitude control voltage VacP and the phase control voltage VtcP, which are the adjustment factors, are capable of being calculated in the above manner.

The adjustment factor determiner 112 supplies the amplitude control voltage VacP and the phase control voltage VtcP that are calculated to the signal adjusting unit or circuit 15 as the adjustment factors.

The use of the method of determining the adjustment factors described above allows the adjustment factors to be accurately determined even when the adjustment factors (the amplitude control voltage Vac and the phase control voltage Vtc) are not stored in the adjustment factor determination table 113. In addition, since it is not necessary to store the adjustment factors for all the combinations of the amplitude difference voltage and the phase difference voltage, a reduction of the control unit or circuit 11 is realized.

Furthermore, the use of the calculation using the linearity between the amplitude difference voltage and the phase difference voltage, the linearity between the amplitude control voltage and the phase control voltage, and the uniqueness among the combination of the amplitude difference voltage and the phase difference voltage, the amplitude control voltage, and the phase control voltage allows the adjustment factors to be accurately calculated through the simple arithmetic processing.

As described above, the provision of the configuration of the present embodiment suppresses entrance of the reflected signal Srt1 of the transmission signal Stx1 reflected from the antenna ANT into the reception circuit 132. Accordingly, it is possible to suppress degradation of reception characteristics of the reception circuit 132.

Although the example is illustrated in the above description in which the amplitude difference voltage is searched for with the phase difference voltage being fixed to calculate the target amplitude control voltage and the target phase control voltage, the phase difference voltage may be searched for with the amplitude difference voltage being fixed to calculate the target amplitude control voltage and the target phase control voltage.

As described above, when the combination of the amplitude difference voltage and the phase difference voltage exists in the adjustment factor determination table 113 (a point DP1 in FIG. 4), the amplitude control voltage and the phase control voltage (a point CP1 in FIG. 4) stored in association with the combination may be read out and the amplitude control voltage and the phase control voltage that are read out may be supplied to the signal adjusting unit or circuit 15.

Figure 5:
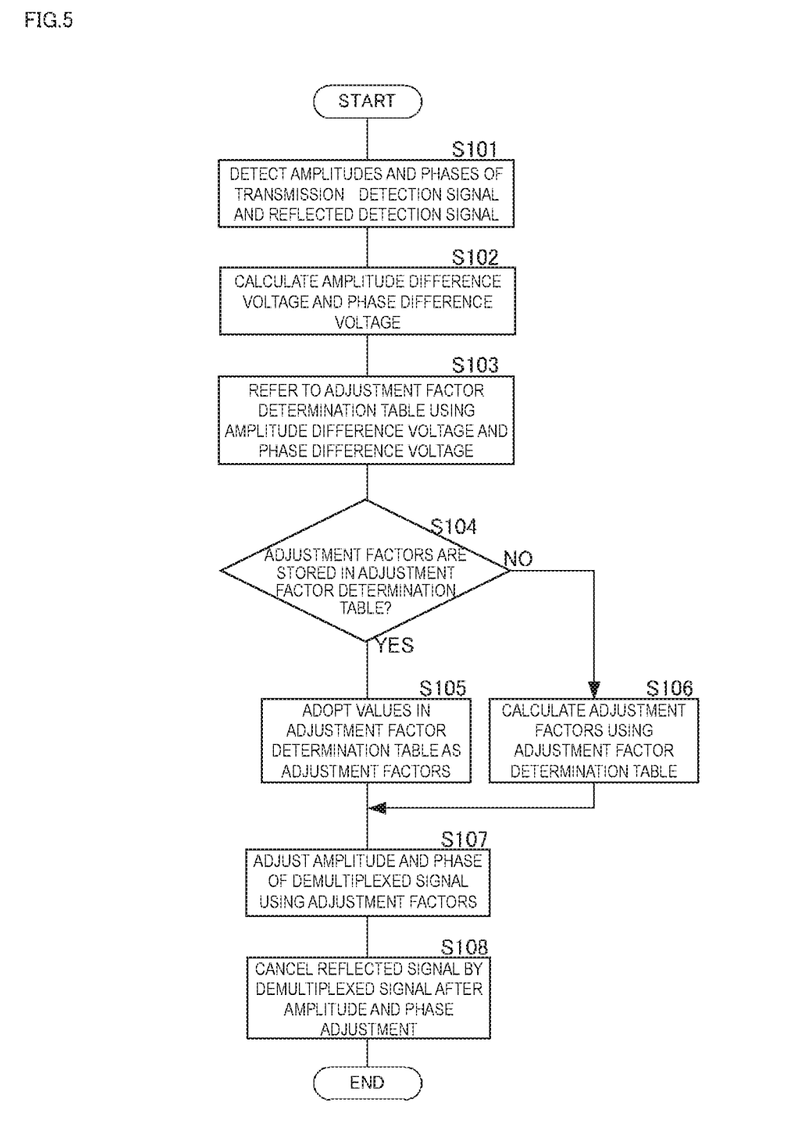
FIG. 5 is a flowchart illustrating a process of determining the adjustment factors in a reflected signal suppressing process according to the first embodiment of the present disclosure.

The process of determining the adjustment factors described above may be programmed to cause a computer to execute the programs. FIG. 5 is a flowchart illustrating a process of determining the adjustment factors in a reflected signal suppressing process according to the first embodiment of the present disclosure.

First, a computer (hereinafter simply referred to as the transmission-reception apparatus) performing the process of determining the adjustment factors in the transmission-reception apparatus detects the amplitudes and the phases of the transmission detection signal Stx1d and the reflected detection signal Srt1d (S101).

Next, the transmission-reception apparatus calculates the amplitude difference voltage and the phase difference voltage between the transmission detection signal Stx1d and the reflected detection signal Srt1d (S102).

Next, the transmission-reception apparatus refers to the adjustment factor determination table 113 (refer to FIG. 4) in order to determine whether the combination of the amplitude difference voltage and the phase difference voltage is stored in the adjustment factor determination table 113 (S103).

Next, if the combination of the amplitude difference voltage and the phase difference voltage is stored in the adjustment factor determination table 113 (YES in S104), the transmission-reception apparatus reads out and adopts the stored adjustment factors (the amplitude control voltage and the phase control voltage) (S105).

If the combination of the amplitude difference voltage and the phase difference voltage is not stored in the adjustment factor determination table 113 (NO in S104), the transmission-reception apparatus calculates the target adjustment factors (the amplitude control voltage and the phase control voltage) using the above method (S106).

The transmission-reception apparatus adjusts the amplitude and the phase of the demultiplexed signal Stx11 using the adopted or calculated adjustment factors (the amplitude control voltage and the phase control voltage) (S107).

The transmission-reception apparatus cancels the reflected signal Srt1 using a demultiplexed signal Stx11c subjected to the amplitude and phase adjustment (S108).

Figure 6:
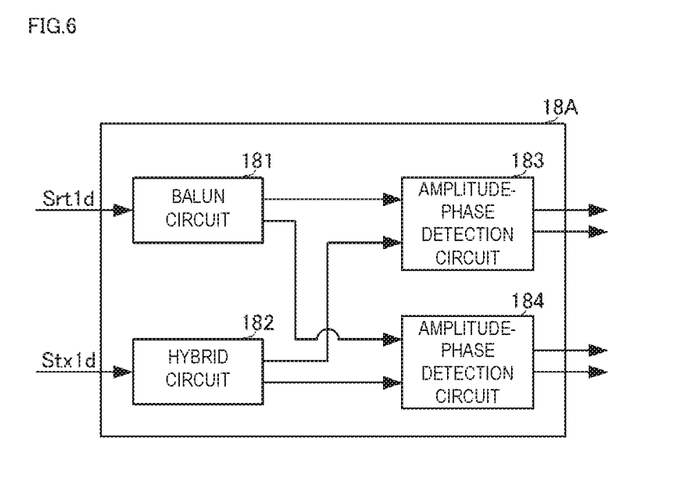
FIG. 6 is a block diagram illustrating a configuration of an amplitude phase detector in a transmission-reception apparatus according to a second embodiment of the present disclosure.

A transmission-reception apparatus according to a second embodiment of the present disclosure will now be described with reference to the attached drawings. FIG. 6 is a block diagram illustrating a configuration of an amplitude phase detector in the transmission-reception apparatus according to the second embodiment of the present disclosure.

The transmission-reception apparatus according to the present embodiment differs from the transmission-reception apparatus 10 according to the first embodiment in the configuration of an amplitude phase detector 18A, and the remaining configuration of the transmission-reception apparatus according to the present embodiment is the same as that of the transmission-reception apparatus 10 according to the first embodiment. Accordingly, only portions different from the transmission-reception apparatus according to the first embodiment will be specifically described.

The amplitude phase detector 18A includes a balun circuit 181, a hybrid circuit 182, and amplitude-phase detection circuits 183 and 184. Input ends of the balun circuit 181 and the hybrid circuit 182 are connected to the detection circuit 16. Output ends of the balun circuit 181 and the hybrid circuit 182 are connected to the amplitude-phase detection circuits 183 and 184, respectively.

The reflected detection signal Srt1d is supplied to the balun circuit 181. The balun circuit 181 outputs a first signal and a second signal having a phase difference of 180° from the reflected detection signal Srt1d. The balun circuit 181 supplies the first signal to the amplitude-phase detection circuit 183 and supplies the second signal to the amplitude-phase detection circuit 184.

The transmission detection signal Stx1d is supplied to the hybrid circuit 182. The hybrid circuit 182 outputs a third signal and a fourth signal that is in the same phase with the third signal from the transmission detection signal Stx1d. The hybrid circuit 182 supplies the third signal to the amplitude-phase detection circuit 183 and supplies the fourth signal to the amplitude-phase detection circuit 184.

The amplitude-phase detection circuit 183 calculates the amplitude difference voltage and the phase difference voltage between the transmission detection signal and the reflected detection signal from the first signal and the third signal. The amplitude-phase detection circuit 184 calculates the amplitude difference voltage and the phase difference voltage between the transmission detection signal and the reflected detection signal from the second signal and the fourth signal.

The above configuration allows a phase difference of 0° to 360° between the transmission detection signal Stx1d and the reflected detection signal Srt1d to be calculated as the phase difference voltage even when the amplitude-phase detection circuits 183 and 184 detect the phase only between 0° to 180°.

The reflected detection signal Srt1d may be supplied to the hybrid circuit 181 and the transmission detection signal Std1 may be supplied to the balun circuit 182.

Although the example is illustrated in the above description in which the signal adjusting unit or circuit includes the amplitude adjuster and the phase adjuster, only one of the amplitude adjuster and the phase adjuster may be provided when an aspect is adopted in which the reflected signal is at least capable of being suppressed with the demultiplexed signal.

Although the aspect is illustrated in the above description in which the amplitude difference value and the phase difference value between the transmission detection signal and the reflected detection signal are represented by voltages, the amplitude difference voltage and the phase difference voltage between the transmission detection signal and the reflected detection signal may be represented by other quantities.

Figure 7:
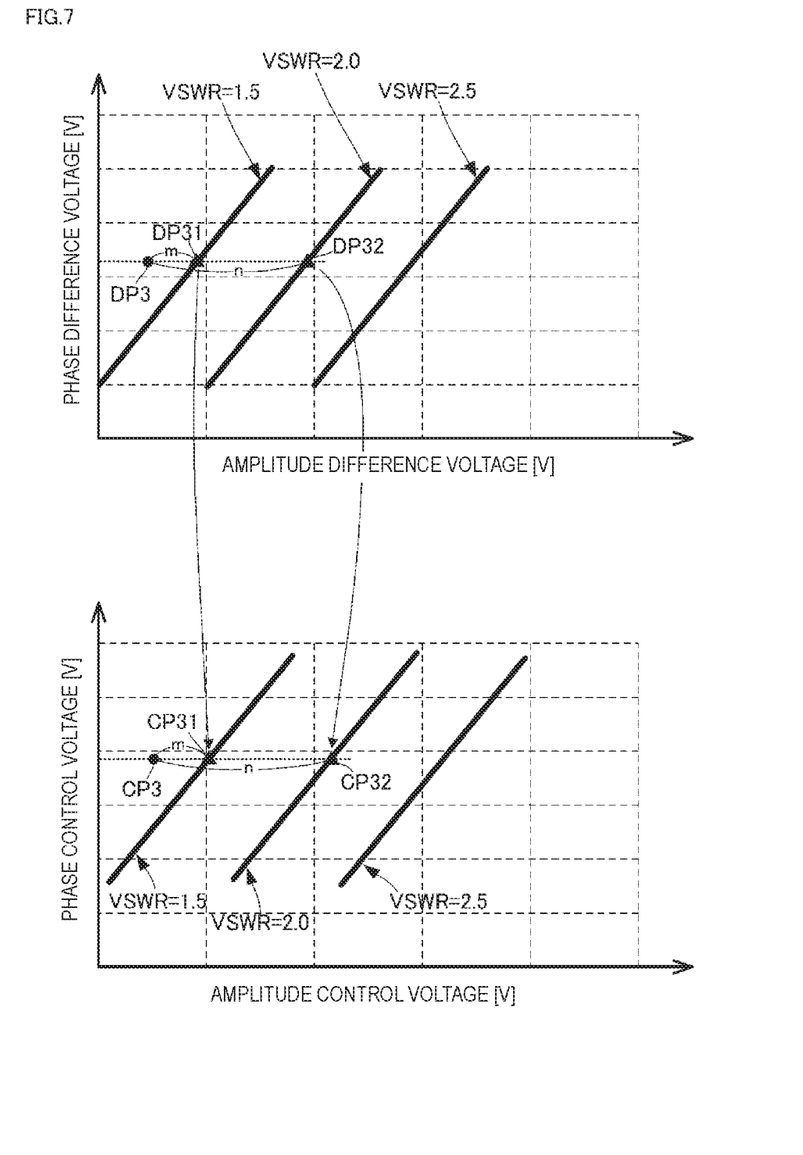
FIG. 7 includes graphs for describing a concept to determine the adjustment factors in a case in which amplitude difference voltage and phase difference voltage that are calculated do not appear between two VSWRs for which the amplitude difference voltage and the phase difference voltage are stored.

Although the case is illustrated in the above description in which the amplitude difference voltage and the phase difference voltage that are calculated appear between two VSWRs for which the amplitude difference voltage and the phase difference voltage are stored, the adjustment factors (the amplitude control voltage and the phase control voltage) are capable of being calculated in the same manner even when the amplitude difference voltage and the phase difference voltage do not appear between two VSWRs for which the amplitude difference voltage and the phase difference voltage are stored. FIG. 7 includes graphs for describing a concept to determine the adjustment factors in the case in which the amplitude difference voltage and the phase difference voltage that are calculated do not appear between two VSWRs for which the amplitude difference voltage and the phase difference voltage are stored.

The adjustment factor determiner 112 detects two amplitude difference voltages (first calculation amplitude difference voltage and second calculation amplitude difference voltage) (a point DP31 and a point DP32 in FIG. 7). The two amplitude difference voltages include amplitude difference voltage having a value closest to that of the calculated amplitude difference voltage and amplitude difference voltage having a value next closest to that of the calculated amplitude difference voltage, which are stored in the adjustment factor determination table 113 and which has the same phase difference voltage.

The adjustment factor determiner 112 reads out from the adjustment factor determination table 113 a combination of first calculation amplitude control voltage and the phase control voltage, which corresponds to the combination (the point DP31 in FIG. 7) of the first calculation amplitude difference voltage and the phase difference voltage (a point CP31 in FIG. 7).

The adjustment factor determiner 112 reads out from the adjustment factor determination table 113 a combination of second calculation amplitude control voltage and the phase control voltage, which corresponds to the combination (the point DP32 in FIG. 7) of the second calculation amplitude difference voltage and the phase difference voltage (a point CP32 in FIG. 7).

The adjustment factor determiner 112 calculates the amplitude control voltage Vac using the first calculation amplitude control voltage and the second calculation amplitude control voltage (a point DP2 in FIG. 7).

Specifically, the adjustment factor determiner 122 calculates a ratio (corresponding to m:n in FIG. 7) between the absolute value of the difference between the amplitude difference voltage and the first calculation amplitude difference voltage (corresponding to the distance between a point DP3 and the point DP31 in FIG. 7) and the absolute value of the difference between the amplitude difference voltage and the second calculation amplitude difference voltage (corresponding to the distance between the point CP3 and the point CP32 in FIG. 7).

The adjustment factor determiner 112 calculates target amplitude control voltage through, for example, the arithmetic processing of an external ratio described below using the above ratio, the first calculation amplitude control voltage corresponding to the first calculation amplitude difference voltage, and the second calculation amplitude control voltage corresponding to the second calculation amplitude difference voltage.

REFERENCE SIGNS LIST 10 transmission-reception apparatus
11 control unit or circuit
111 amplitude phase parameter calculator
112 adjustment factor determiner
113 adjustment factor determination table
12 antenna duplexer
131 first transmission-reception circuit
132 second transmission-reception circuit
141 demultiplexer
142 multiplexer
15 signal adjusting unit or circuit
151 amplitude adjuster
152 phase adjuster
16 detection circuit
17 antenna matching circuit
18, 18A amplitude phase detector
181 balun circuit
182 hybrid circuit
183, 184 amplitude-phase detection circuit
ANT antenna

The invention claimed is:
1. A transmission-reception apparatus comprising:
a first radio-frequency circuit at least including a transmission circuit that outputs a transmission signal;
a second radio-frequency circuit at least including a reception circuit that receives a reception signal;
an antenna duplexer that is connected between the first radio-frequency circuit and second radio-frequency circuit and an antenna, and that transmits the transmission signal from the first radio-frequency circuit to the antenna and transmits the reception signal from the antenna to the second radio-frequency circuit;
a demultiplexer that demultiplexes the transmission signal;
a signal adjusting circuit that adjusts at least one of an amplitude and a phase of a demultiplexed signal demultiplexed by the demultiplexer;
a multiplexer that is connected between the antenna duplexer and the second radio-frequency circuit, and that multiplexes the demultiplexed signal adjusted in the signal adjusting circuit with a signal transmitted from the antenna duplexer to the second radio-frequency circuit;
a sensing circuit that detects the transmission signal and a reflected signal of the transmission signal from the antenna and detects an amplitude and a phase of a transmission detection signal and an amplitude and a phase of a reflected detection signal; and
a control circuit that determines an adjustment factor based on a result of the detection in the sensing circuit to adjust a circuit factor of the signal adjusting circuit,
wherein the control circuit calculates an amplitude difference value and a phase difference value from the amplitude and the phase of the transmission detection signal and the amplitude and the phase of the reflected detection signal, the amplitude difference value and the phase difference value being differences in amplitude and phase, respectively, between the transmission detection signal and the reflected detection signal,
wherein the control circuit includes an adjustment factor determination table that discretely stores adjustment factors including an amplitude control value and a phase control value corresponding to a combination of an amplitude difference value and a phase difference value, and
wherein the control circuit determines the adjustment factors using the combination of the amplitude difference value and the phase difference value and the adjustment factor determination table and supplies the determined adjustment factors to the signal adjusting circuit.

2. The transmission-reception apparatus according to claim 1,
wherein, if the combination of the amplitude difference value and the phase difference value is not stored in the adjustment factor determination table, the control circuit determines the adjustment factors using multiple combinations of amplitude difference values and phase difference values stored in the adjustment factor determination table, and the combination of the amplitude difference value and the phase difference value that are calculated.

3. The transmission-reception apparatus according to claim 1,
wherein the sensing circuit includes:
a balun circuit to which the reflected detection signal is input, and that outputs a first signal and outputs a second signal that is in opposite phase with the first signal;
a hybrid circuit to which the transmission detection signal is input, and that outputs a third signal and outputs a fourth signal that is in phase with the third signal;
a first amplitude-phase detection circuit that detects the amplitudes and the phases of the transmission detection signal and the reflected detection signal from the first signal and the third signal; and
a second amplitude-phase detection circuit that detects the amplitudes and the phases of the transmission detection signal and the reflected detection signal from the second signal and the fourth signal.

4. The transmission-reception apparatus according to claim 1,
wherein the sensing circuit includes:
a balun circuit to which the transmission detection signal is input, and that outputs a first signal and outputs a second signal that is in opposite phase with the first signal;
a hybrid circuit to which the reflected detection signal is input, and that outputs a third signal and outputs a fourth signal that is in phase with the third signal;
a first amplitude-phase detection circuit that detects the amplitudes and the phases of the transmission detection signal and the reflected detection signal from the first signal and the third signal; and
a second amplitude-phase detection circuit that detects the amplitudes and the phases of the transmission detection signal and the reflected detection signal from the second signal and the fourth signal.

5. A reflected signal suppressing method of suppressing a reflected signal resulting from reflection of a transmission signal from an antenna with a demultiplexed signal resulting from demultiplexing of part of the transmission signal from the antenna, the reflected signal suppressing method comprising:
detecting the transmission signal and the reflected signal to detect an amplitude and a phase of a transmission detection signal and an amplitude and a phase of a reflected detection signal;
calculating an amplitude difference value and a phase difference value from the amplitude and the phase of the transmission detection signal and the amplitude and the phase of the reflected detection signal, the amplitude difference value and the phase difference value being differences in amplitude and phase, respectively, between the transmission detection signal and the reflected detection signal;
determining adjustment factors using an adjustment factor determination table and a combination of the amplitude difference value and the phase difference value, the adjustment factor determination table discretely storing the adjustment factors including an amplitude control value and a phase control value corresponding to a combination of the amplitude difference value and the phase difference value;
adjusting the amplitude and the phase of the demultiplexed signal based on the adjustment factors; and
multiplexing the demultiplexed signal.

6. The reflected signal suppressing method according to claim 5,
wherein, if the combination of the amplitude difference value and the phase difference value between the transmission detection signal and the reflected detection signal is not stored in the adjustment factor determination table, the adjustment factors are determined using multiple combinations of amplitude difference values and phase difference values stored in the adjustment factor determination table, and the combination of the amplitude difference value and the phase difference value that are calculated.

7. The reflected signal suppressing method according to claim 1, further comprising:
detecting the amplitudes and the phases of the transmission detection signal and the reflected detection signal from first and third signals; and
detecting the amplitudes and the phases of the transmission detection signal and the reflected detection signal from second and fourth signals,
wherein the first and second signals are output from a balun circuit to which the reflected detection signal is input,
wherein the third and fourth signals are output from a hybrid circuit to which the transmission detection signal is input,
wherein the second signal is in opposite phase with the first signal, and
wherein the fourth signal is in phase with the third signal.

8. The reflected signal suppressing method according to claim 1, further comprising:
detecting the amplitudes and the phases of the transmission detection signal and the reflected detection signal from first and third signals; and
detecting the amplitudes and the phases of the transmission detection signal and the reflected detection signal from second and fourth signals,
wherein the first and second signals are output from a balun circuit to which the transmission detection signal is input,
wherein the third and fourth signals are output from a hybrid circuit to which the reflected detection signal is input,
wherein the second signal is in opposite phase with the first signal, and
wherein the fourth signal is in phase with the third signal.

* * * * *